(12) United States Patent
Bossen et al.

(10) Patent No.: US 10,841,613 B2
(45) Date of Patent: *Nov. 17, 2020

(54) LOW-COMPLEXITY INTRA PREDICTION FOR VIDEO CODING

(71) Applicant: NTT DOCOMO, INC., Tokyo (JP)

(72) Inventors: Frank Jan Bossen, Mountain View, CA (US); Thiow Keng Tan, Jalan Sindor (MY)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,188

(22) Filed: Jul. 12, 2019

(65) Prior Publication Data

US 2019/0335201 A1    Oct. 31, 2019

Related U.S. Application Data

(63) Continuation of application No. 15/903,390, filed on Feb. 23, 2018, now Pat. No. 10,397,608, which is a
(Continued)

(51) Int. Cl.
*H04N 9/11* (2006.01)
*H04N 19/593* (2014.01)
(Continued)

(52) U.S. Cl.
CPC .......... *H04N 19/593* (2014.11); *H04N 19/11* (2014.11); *H04N 19/176* (2014.11); *H04N 19/61* (2014.11); *H04N 19/82* (2014.11)

(58) Field of Classification Search
CPC .... H04N 19/11; H04N 19/176; H04N 19/593; H04N 19/61; H04N 19/82
See application file for complete search history.

(56) References Cited

U.S. PATENT DOCUMENTS

| 6,263,108 B1 | 7/2001 | Kondo et al. |
| 7,664,178 B2 * | 2/2010 | Abe ..................... H04N 19/105 375/240.13 |

(Continued)

FOREIGN PATENT DOCUMENTS

| EP | 3232666 A1 | 10/2017 |
| JP | 2007-214641 A | 8/2007 |

(Continued)

OTHER PUBLICATIONS

Office Action in Russia Application No. 2019112303, dated Oct. 30, 2019, 14 pages.
(Continued)

*Primary Examiner* — Md N Haque
(74) *Attorney, Agent, or Firm* — Brinks Gilson & Lione

(57) ABSTRACT

The present invention provides a unique intra prediction process which improves the efficiency of video coding. H.264/AVC uses reference pixels in a horizontal boundary located immediately above a target block to be predicted and reference pixels in a vertical boundary located immediately left of the target block. In the present invention, at least some of one of an array of horizontal boundary pixels and an array of vertical boundary pixels are retrieved. Then, the retrieved pixels are added to the other boundary pixels to extend the array thereof. Intra prediction is performed, based solely on the extended array of boundary pixels.

6 Claims, 12 Drawing Sheets

Related U.S. Application Data continuation of application No. 14/871,274, filed on Sep. 30, 2015, now Pat. No. 9,942,565, which is a continuation of application No. 13/809,511, filed as application No. PCT/US2011/044014 on Jul. 14, 2011, now Pat. No. 9,225,986.

(60) Provisional application No. 61/388,541, filed on Sep. 30, 2010, provisional application No. 61/364,322, filed on Jul. 14, 2010.

(51) Int. Cl.
  *H04N 19/176* (2014.01)
  *H04N 19/61* (2014.01)
  *H04N 19/11* (2014.01)
  *H04N 19/82* (2014.01)

(56) References Cited

U.S. PATENT DOCUMENTS

| | | | | |
|---|---|---|---|---|
| 2003/0206594 | A1* | 11/2003 | Zhou | H04N 19/105 375/240.16 |
| 2005/0243920 | A1* | 11/2005 | Murakami | H04N 19/61 375/240.12 |
| 2006/0110065 | A1 | 5/2006 | Huang et al. | |
| 2006/0285757 | A1 | 12/2006 | Abe et al. | |
| 2008/0247462 | A1* | 10/2008 | Demos | H04N 19/597 375/240.03 |
| 2009/0225834 | A1 | 9/2009 | Song et al. | |
| 2009/0268810 | A1 | 10/2009 | Dai | |
| 2010/0034268 | A1 | 2/2010 | Kusakabe et al. | |
| 2010/0128168 | A1 | 5/2010 | Zhen et al. | |
| 2010/0177821 | A1 | 7/2010 | Kadoto et al. | |
| 2010/0260263 | A1* | 10/2010 | Kotaka | H04N 19/147 375/240.15 |
| 2016/0080773 | A1* | 3/2016 | Nakamura | H04N 19/186 375/240.12 |

FOREIGN PATENT DOCUMENTS

| | | |
|---|---|---|
| JP | 2009-177722 A | 8/2009 |
| WO | WO 2011/021839 A2 | 2/2011 |

OTHER PUBLICATIONS

McCann, Ken et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Document JCTVC-A124, 1st Meeting: Dresden, DE, Apr. 15-23, 2010, 40 pages.
Richardson, Iain E.G., "H.264 and MPEG-4 Video Compression: Video Coding for Next-generation Multimedia," *John Wiley & Sons*, Hoboken, NJ, US, Dec. 31, 2003, pp. 159-223.
Ugur, Kemal et al., "Description of video coding technology proposal by Tandberg, Nokia, Ericsson," Joint Collaborative Team on Video Coding (JCT-VC) of ITU-T SG16 WP3 and ISO/IEC JTC1/SC29/WG11, Document JCTVC-A119, 1st Meeting: Dresden, DE, Apr. 15-23, 2010, 33 pages.
Unknown author, "Advanced video coding for generic audiovisual services," Series H: Audiovisual and Multimedia Systems: Infrastructure of audiovisual services-Coding of moving video, Section 8.3, ITU-T H.264, Mar. 2010, 23 pages.
International Search Report in International Application No. PCT/US2011/044014, dated Nov. 25, 2011, 1 page.
Extended European Search Report in corresponding European Application No. 11807512.6, dated Jul. 2, 2014, 11 pages.
Subsequent Substantive Examination Report in corresponding Phillippines Application No. 1/2013/500024, dated Dec. 3, 2014, 2 pages.
Office Action and Search Report, and English language translation thereof, in corresponding Chinese Applicaton No. 201180034682.2, dated May 26, 2015, 19 pages.
Official Action, and English language translation thereof, in corresponding Russian Application No. 2013106296/08(009361), dated Jun. 23, 2015, 9 pages.
Examination Report, Communication Pursuant to Article 94(3) EPC in corresponding European Application No. 11 807 512.6, dated Jul. 27, 2015, 8 pages.
Extended Search Report for European Patent Application Serial No. 15 16 9606.9 dated Sep. 23, 2015, 9 pages.
Bossen et al., "Simplified Angular Infra Prediction", *2.JCT-VC Meeting (Joint Collaborative Team on Video Coding of ISO/IEC JTC1/SC29/WG11 and ITU-T SG. 16)*, XP030007673, Jul. 17, 2010, 3 pages.
Office Action for Canadian Application No. 2,804,762 dated Jul. 24, 2015, 5 pages.
Office Action for Canadian Application No. 2,804,762 dated Dec. 9, 2015, 4 pages.
Office Action and English language translation thereof, in corresponding Korean Application No. 10-2013-7000687, dated Dec. 18, 2015, 6 pages.
Office Action in corresponding European Application No. 11807512.6, dated Feb. 24, 2016, 7 pages.
Office Action, and English language translation thereof, in corresponding Mexican Application No. MX/a/2015/002858, dated Feb. 10, 2016, 11 pages.
Office Action, and English language translation thereof, in corresponding Korean Application No. 10-2013-7000687, dated Apr. 26, 2016, 5 pages.
Office Action, and English language translation thereof, in corresponding Korean Application Serial No. 10-2013-7000687, dated Aug. 4, 2016, 5 pages.
Office Action, and English language translation thereof, in corresponding Korean Application No. 10-2016-7020283, dated Jan. 31, 2017, 9 pages.
"Test Model Under Consideration", *Joint Collaborative Team on Video Coding (JCT-VC) of ITU-T SG16 WP3 and ISO/IEC JTC1/SC29/WG11*, 1st Meeting, Dresden, DE, Apr. 15-23, 2010, 141 pages.
Office Action, and English language translation thereof, in corresponding Korean Application No. 10-2016-7020284, dated Mar. 3, 2017, 8 pages.
Office Action in U.S. Appl. No. 14/871,144, dated Sep. 20, 2017, 7 pages.
Korean Patent Office, Office Action in Korean Application No. 10-2018-7005732 dated May 16, 2018, 7 pages.
Samsung Electronics Co., Ltd. and British Broadcasting Corporation, 2010, "JCTVC-A124_software" TComPrediction.cpp, dated Apr. 23, 2010, pp. 1-38.
Indian Patent Office, Office Action in Indian Application No. 329/CHENP/2013 dated May 24, 2018, pp. 1-7.
Office Action in U.S. Appl. No. 16/510,217, dated May 8, 2020, 14 pages.
Office Action in Russian Application No. 2019112303, dated Mar. 17, 2020, 8 pages.

\* cited by examiner ated Sep. 30, 2015, which is continuation of U.S. patent application Ser. No. 13/809,511, filed Jan. 10, 2013, which is a 371 application of PCT/US2011/044014 having international filing date of Jul. 14, 2011, which claims priority to U.S. Provisional application Nos. 61/388,541 filed Sep. 30, 2010 and 61/364,322 filed Jul. 14, 2010, the entire contents of which are incorporated herein by reference.

LOW-COMPLEXITY INTRA PREDICTION FOR VIDEO CODING

RELATED APPLICATIONS

This application is continuation of U.S. patent application Ser. No. 15/903,390 filed Feb. 23, 2018, which is continuation of U.S. patent application Ser. No. 14/871,274, filed Sep. 30, 2015, which is continuation of U.S. patent application Ser. No. 13/809,511, filed Jan. 10, 2013, which is a 371 application of PCT/US2011/044014 having international filing date of Jul. 14, 2011, which claims priority to U.S. Provisional application Nos. 61/388,541 filed Sep. 30, 2010 and 61/364,322 filed Jul. 14, 2010, the entire contents of which are incorporated herein by reference.

BACKGROUND OF THE INVENTION

1. Technical Field Text

The present invention relates to video coding and in particular to intra-frame prediction in which a block of sample is predicted, using previously encoded and reconstructed pixels from the same video frame.

2. Background Information

Digital video requires a large amount of data to represent each and every frame of a digital video sequence (e.g., series of frames) in an uncompressed manner. It is not feasible for most applications to transmit uncompressed digital video across computer networks because of bandwidth limitations. In addition, uncompressed digital video requires a large amount of storage space. The digital video is normally encoded in some manner to reduce the storage requirements and reduce the bandwidth requirements.

One technique for encoding digital video is inter-frame prediction, or inter prediction. Inter prediction exploits temporal redundancies among different frames. Temporally adjacent frames of video typically include blocks of pixels, which remain substantially the same. During the encoding process, a motion vector interrelates the movement of a block of pixels in one frame to a block of similar pixels in another frame. Accordingly, the system is not required to encode the block of pixels twice, but rather encodes the block of pixels once and provides a motion vector to predict the other block of pixels.

Another technique for encoding digital video is intra-frame prediction or intra prediction. Intra prediction encodes a frame or a portion thereof without reference to pixels in other frames. Intra prediction exploits spatial redundancies among blocks of pixels within a frame. Because spatially adjacent blocks of pixels generally have similar attributes, the efficiency of the coding process is improved by referencing the spatial correlation between adjacent blocks. This correlation may be exploited by prediction of a target block based on prediction modes used in adjacent blocks.

SUMMARY OF THE INVENTION

The present invention provides a unique intra prediction process which improves the efficiency of video coding. H.264/AVC uses reference pixels in a horizontal boundary located immediately above a target block to be predicted and reference pixels in a vertical boundary located immediately left of the target block. In the present invention, at least some of either an array of horizontal boundary pixels or an array of vertical boundary pixels are retrieved. Then, the retrieved pixels are added to the other boundary pixels to extend the array thereof. Intra prediction is performed, based solely on the extended array of boundary pixels. In an embodiment of the present invention, at least some of the vertical boundary pixels are retrieved and added to the horizontal boundary pixels to extend the array thereof.

The present invention eliminates the decision process of selecting either the horizontal boundary or the vertical boundary from which reference pixels are retrieved. The present invention also eliminates the recurring process of calculating a position of the vertical boundary intersecting with a prediction direction, wherein the recurring calculation process typically includes a divisional operation. Elimination of these processes enables the intra prediction process to be implemented on Single-Instruction Multiple Data (SIMD) architectures, thereby improving the computational efficiency of video coding.

In an embodiment according to the present invention, at least some of the pixels among the vertical boundary pixels are retrieved, using a vertical pixel identifier which is expressed by $$\left[\frac{size \times col}{angle}\right],$$

where size represents a size of a target block to be predicted, angle represents a prediction direction and col is a counter which is decremented by 1 from −1 to the angle. The retrieved pixels are added to the horizontal pixels at a location identified by a horizontal pixel identifier [col].

In another embodiment, in retrieving at least some of vertical boundary pixels, InvAngle is calculated from $$\frac{N \times size}{angle},$$

where N is an integer power of 2. Then, at least some of the pixels among the vertical boundary pixels are retrieved, using a vertical pixel identifier which is expressed by [col×InvAngle>>log₂ N]. The retrieved pixels are added to the horizontal pixels at a location identified by a horizontal pixel identifier [col].

In another embodiment, InvAngle is obtained from a look-up table which lists values of InvAngle in relation to the values of angle.

In another embodiment, a pixel is identified among the vertical boundary pixels, using a vertical pixel identifier [row], where row is a counter which is incremented by 1 from 0 to size. The retrieved pixel is added to the horizontal boundary pixels at a location identified by a horizontal pixel identifier [int+1], where int is an integer representation of a position of a pixel intersecting with a prediction direction.

The present invention also provides an encoder and a decoder which implement an intra prediction operation in which at least some of either an array of horizontal boundary pixels or an array of vertical boundary pixels are retrieved. Then, the retrieved pixels are added to the other boundary pixels to extend the array thereof. Intra prediction is performed, based solely on the extended array of boundary pixels.

DETAILED DESCRIPTION OF THE DRAWINGS AND THE PRESENTLY PREFERRED EMBODIMENTS

Figure 1:
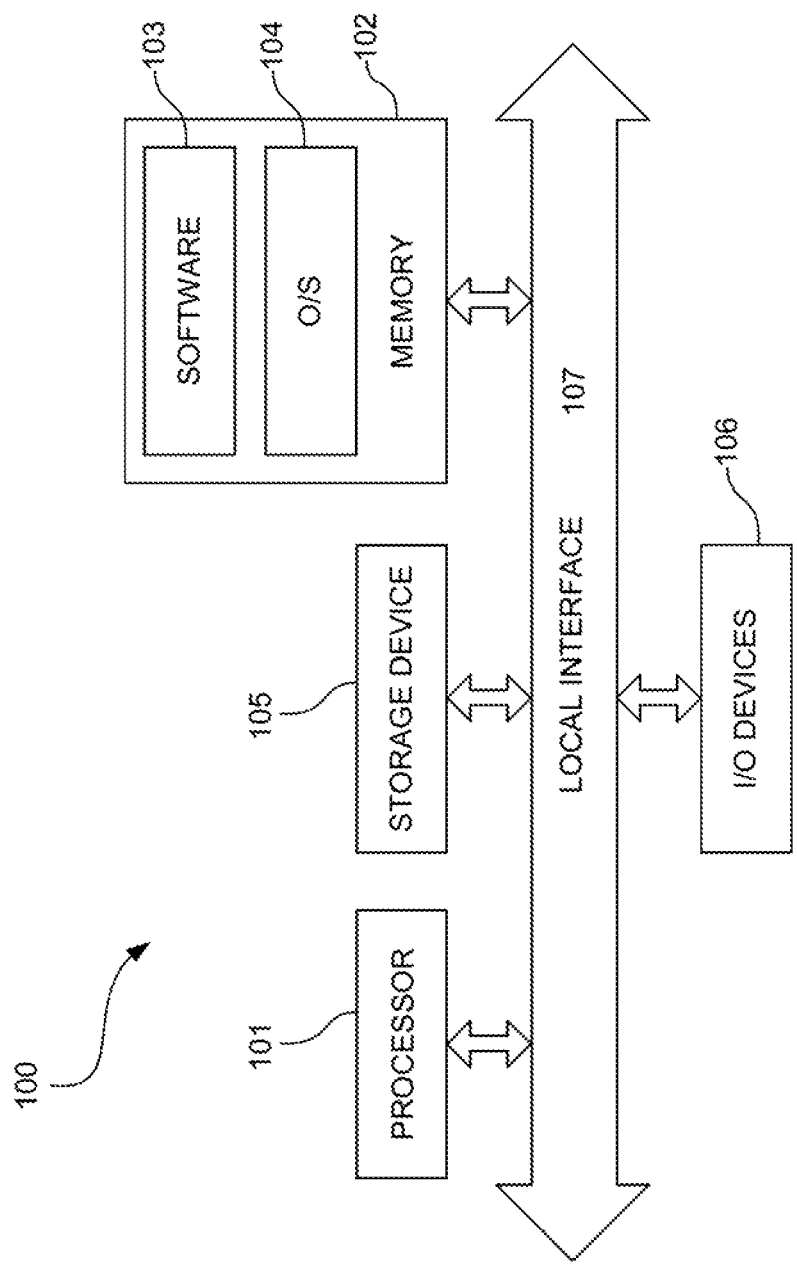
FIG. 1 is a block diagram showing an exemplary hardware architecture on which the present invention may be implemented.

FIG. 1 shows an exemplary hardware architecture of a computer 100 on which the present invention may be implemented. Please note that the hardware architecture shown in FIG. 1 may be common in both a video encoder and a video decoder which implement the embodiments of the present invention. The computer 100 includes a processor 101, memory 102, storage device 105, and one or more input and/or output (I/O) devices 106 (or peripherals) that are communicatively coupled via a local interface 107. The local interface 105 can be, for example, but not limited to, one or more buses or other wired or wireless connections, as is known in the art.

The processor 101 is a hardware device for executing software, particularly that stored in the memory 102. The processor 101 can be any custom made or commercially available processor, a central processing unit (CPU), an auxiliary processor among several processors associated with the computer 100, a semiconductor based microprocessor (in the form of a microchip or chip set), or generally any device or executing software instructions.

The memory 102 comprises a computer readable medium which can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 102 may incorporate electronic, magnetic, optical, and car other types of storage media. A computer readable medium can be any means that can store, communicate, propagate or transport the program fear use by or in connection with the instruction execution system, apparatus or device. Please note that the memory 102 can have a distributed architecture, where various components are situated remote from one another, but can be accessed by the processor 101.

The software 103 in the memory 102 may include one or more separate programs, each of which contains an ordered listing of executable instructions for implementing logical functions of the computer 100, as described below. In the example of FIG. 1, the soft dare 103 in the memory 102 defines the computer 100's video encoding or video decoding functionality m accordance with the present invention. In addition, although not required, it is possible for the memory 102 to contain an operating system (O/S) 104. The operating system 104 essentially controls the execution of computer programs and provides scheduling, input-output control, file and data management, memory management, and communication control and related services.

The storage device 105 of the computer 100 may be one of many different types of storage device, including a stationary storage device or portable storage device. As an example, the storage device 105 may be a magnetic tape, disk, flash memory, volatile memory, or a different storage device, in addition, the storage device 105 may be a secure digital memory card or any other removable storage device 105.

The I/O devices 106 may include input devices, for example, but not limited to a touch screen, a keyboard, mouse, scanner, microphone or other input device. Furthermore, the I/O devices 106 may also include output devices, for example, but not limited to a display or other output devices. The I/O devices 106 may further include devices that communicate via both inputs and outputs, for instance, but not limited to a modulator/demodulator (modem; for accessing another device, system, or network), a radio frequency (RF), wireless or other transceiver, a telephonic interface, a bridge, a router or other devices that function both as an input and an output.

As is well known by those having ordinary skill in the art, video compression is achieved by removing redundant information in a video sequence. Many different video coding standards exist, examples of which include MPEG-1, MPEG-2, MPEG-4, H.261, H.263, and H.264/AVC. It should be noted that the present invention is not intended to be limited in application of any specific video coding standard. However, the following description of the present invention is provided, using the example of H.264/AVC standard, which is incorporated herein by reference. H.264/AVC is the newest video coding standard and achieves a significant performance improvement over the previous coding standards such as MPEG-1, MPEG-2, H.261 and H.263.

In H.264/AVC, each frame or picture of a video can be broken into several slices. The slices are then divided into blocks of 16×16 pixels called macroblocks, which can then be further divided into blocks of 8×16, 16×8, 8×8, 4×8, 8×4, down to 4×4 pixels. There are five types of slices supported by H.264/AVC. In I slices, all the macroblocks are coded using intra prediction. In P slices, macroblocks can be coded using intra or inter prediction. P slices allow only one motion compensated prediction (MCP) signal per macroblock to be used. In B slices, macroblocks can be coded using intra or inter prediction. Two MCP signals may be used per prediction. SP slices allow P slices to be switched between different video streams efficiently. An SI slice is an exact match for an SP slice for random access or error recovery, while using only intra prediction.

Figure 2:
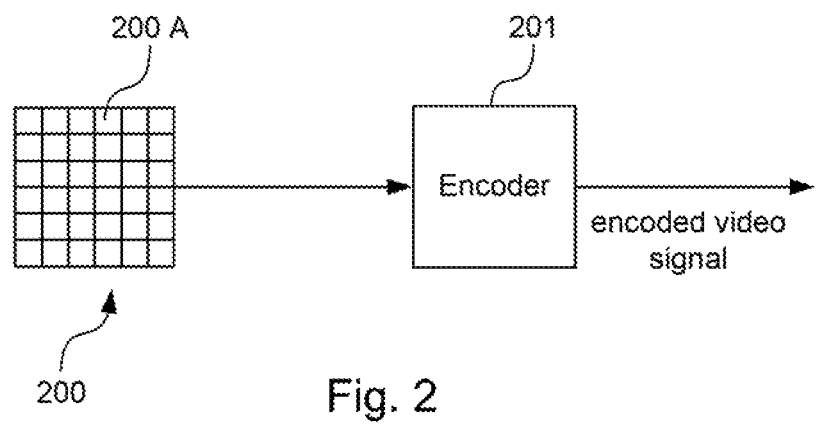
FIG. 2 is a block diagram showing a general view of a video encoder to which the present invention may be applied.

FIG. 2 shows a general view of a video encoder to which the present invention may be applied. The blocks shown in the figure represent functional modules realized by the processor 101 executing the software 103 in the memory 102. A picture of video frame 200 is fed to a video encoder 201. The video encoder treats the picture 200 in units of macroblocks 200A. Each macroblock contains several pixels of picture 200. On each macroblock a transformation into transform coefficients is performed followed by a quantization into transform coefficient levels. Moreover, intra prediction or inter prediction is used, so as not to perform the coding steps directly on the pixel data but on the differences of same to predicted pixel values, thereby achieving small values which are more easily compressed.

For each slice, the encoder 201 generates a number of syntax elements, which form a coded version of the macroblocks of the respective slice. All residual data elements in the syntax elements, which are related to the coding of transform coefficients, such as the transform coefficient levels or a significance map indicating transform coefficient levels skipped are called residual data syntax elements. Besides these residual data syntax elements, the syntax elements generated by the encoder 201 contain control information syntax elements containing control information as to how each macroblock has been encoded and has to be decoded, respectively. In other words, the syntax elements are dividable into two categories. The first category, the control information syntax elements, contains the elements related to a macroblock type, sub-macroblock type and information on prediction modes both of a spatial and temporal types, as well as slice-based and macroblock-based control information, for example. In the second category, all residual data elements, such as a significance map indicating the locations of all significant coefficients inside a block of quantized transform coefficients and the values of the significant coefficients, which are indicated in units of levels corresponding to the quantization steps, are combined and become residual data syntax elements.

The encoder 201 comprises an entropy coder which encodes syntax elements and generates arithmetic codewords for each slice. When generating the arithmetic codewords for a slice, the entropy coder exploits statistical dependencies among the data values of syntax elements in the video signal bit stream. The encoder 201 outputs an encoded video signal for a slice of picture 200 to a video decoder 301 shown in FIG. 3.

Figure 3:
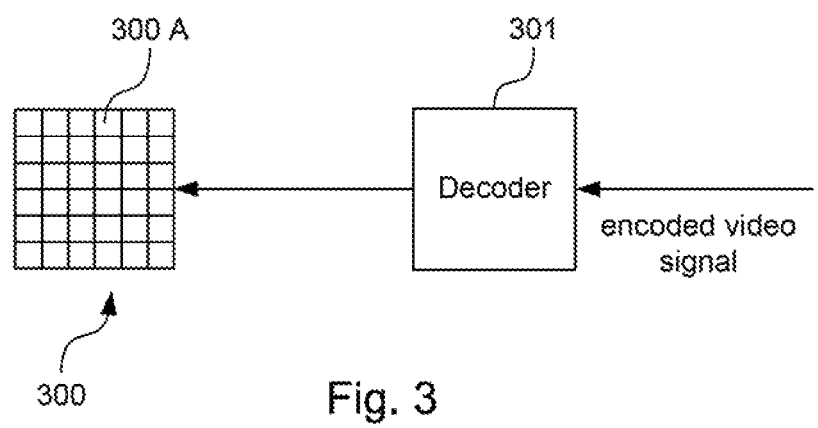
FIG. 3 is a block diagram showing a general view of a video decoder to which the present invention may be applied.

FIG. 3 shows a general view of a video decoder to which the present invention may be applied. Likewise, the blocks shown in the figure represent functional modules realized by the processor 101 executing the software 103 in the memory 102. The video decoder 301 receives the encoded video signal and first entropy-decodes the signal back into the syntax elements. The decoder 301 uses the syntax elements in order to reconstruct, macroblock by macroblock and then slice after slice, the picture samples 300A of pixels in the picture 300.

Figure 4:
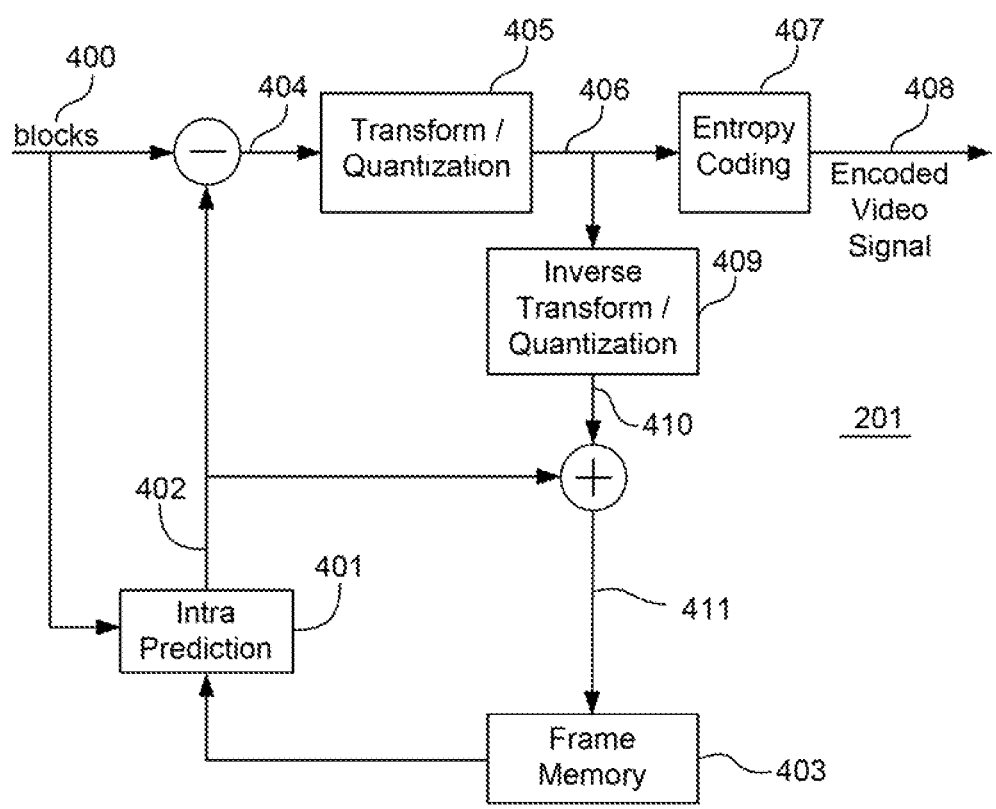
FIG. 4 is a block diagram showing the functional modules of an encoder according an embodiment of the present invention.

FIG. 4 shows the functional modules of the video encoder 201. These functional modules are realized by the processor 101 executing the software 103 in the memory 102. An input video picture is a frame or a field of a natural (uncompressed) video image defined by sample points representing components of original colors, such as chrominance ("chroma") and luminance ("luma") (other components are possible, for example, hue, saturation and value). The input video picture is divided into macroblocks 400 that each represent a square picture area consisting of 16×16 pixels of the luma component of the picture color. The input video picture is also partitioned into macroblocks that each represent 8×8 pixels of each of the two chroma components of the picture color. In general encoder operation, inputted macroblocks may be temporally or spatially predicted using inter or intra prediction. It is however assumed for the purpose of discussion that the macroblocks 400 are all I-slice type macroblocks and subjected only to intra prediction.

Intra prediction is accomplished at an intra prediction module 401, the operation of which will be discussed below in detail. The intra prediction module 401 generates a prediction block 402 from horizontal and vertical boundary pixels of neighboring blocks, which have previously been encoded, reconstructed, and stored in a frame memory 403. A residual 404 of the prediction block 402, which is the difference between a target block 400 and the prediction block 402, is transformed, scaled and quantized at a transformation/quantization module 405, using methods and techniques known to those of skill in the video coding field. Quantized transform coefficients 406 are then entropy-coded at an entropy coding module 407 and transmitted (together with other information relating to the intra prediction) as an encoded video signal 408.

The video encoder 201 contains decoding functionality to perform intra prediction on target blocks. The decoding functionality comprises an inverse quantization/transformation module 409, which performs inverse quantization and inverse transformation on the quantized transform coefficients 406 to produce the decoded prediction residual 410, which is added to the prediction block 402. The sum of decoded prediction residual 410 and prediction block 402 is a reconstructed block 411, which is stored in the frame memory 403 and will be read therefrom and used by the intra prediction module 401 to generate a prediction block 402 for decoding of a next target block 400.

Figure 5:
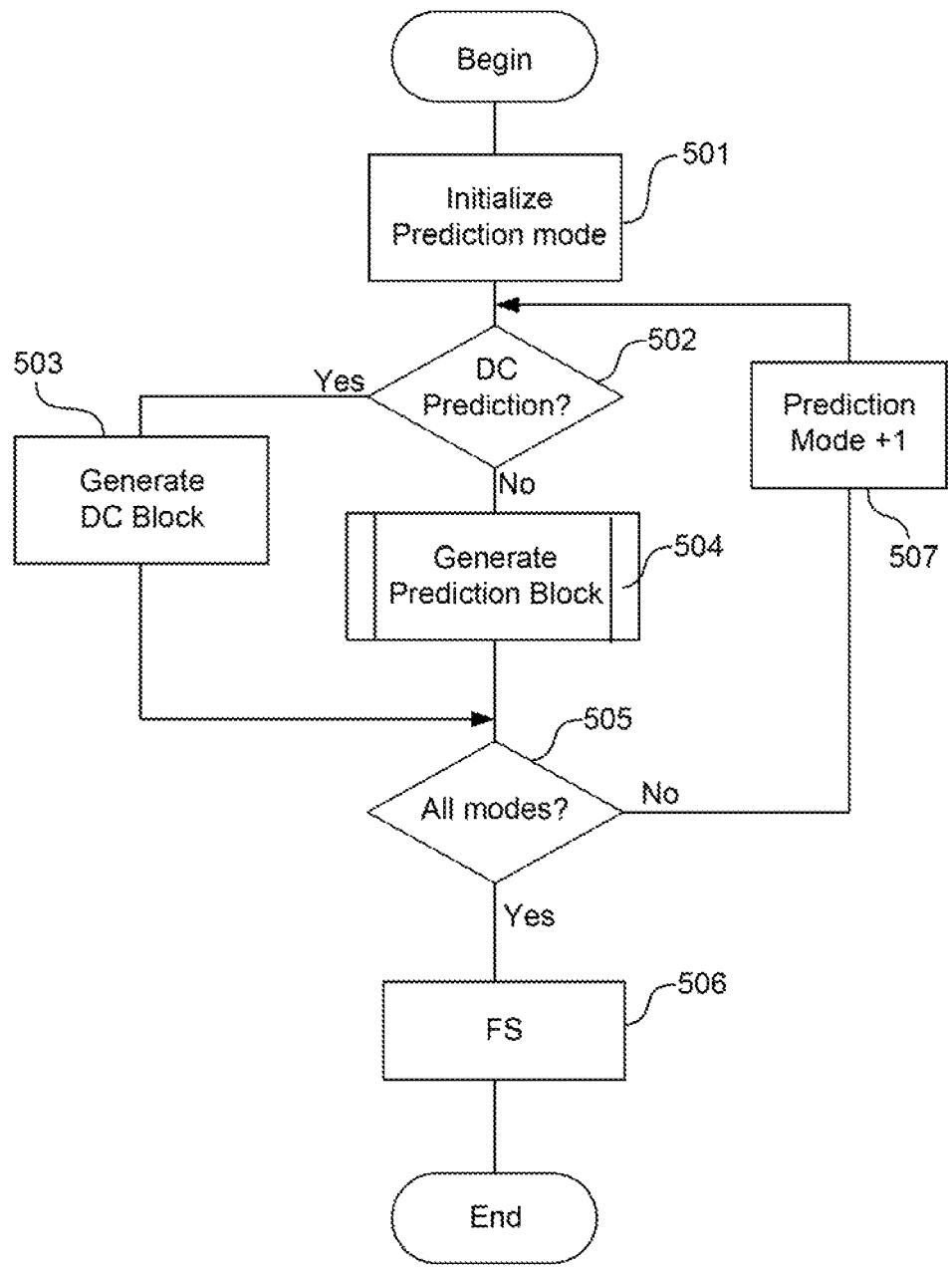
FIG. 5 is a flowchart showing an intra prediction process performed by an intra prediction module of the embodiment of the present invention.

FIG. 5 is a flowchart showing processes performed by the intra prediction module 401. In accordance with the H.264/AVC Standard, intra prediction involves predicting each pixel of the target block 400 under a plurality of prediction modes, using interpolations of boundary pixels ("reference pixels") of neighboring blocks previously encoded and reconstructed. The prediction modes are identified by positive integer numbers 0, 1, 2 . . . each associated with a different instruction or algorithm for predicting specific pixels in the target block 400. The intra prediction module 401 runs intra prediction under the respective prediction modes and generates different prediction blocks. Under a full search ("FS") algorithm, each of the generated prediction blocks is compared to the target block 400 to find the optimum prediction mode, which minimizes the prediction residual 404 or produces a lesser prediction residual 404 among the prediction modes. The identification of the optimum prediction mode is compressed and sent to the decoder 301 with other control information syntax elements.

Figure 7:
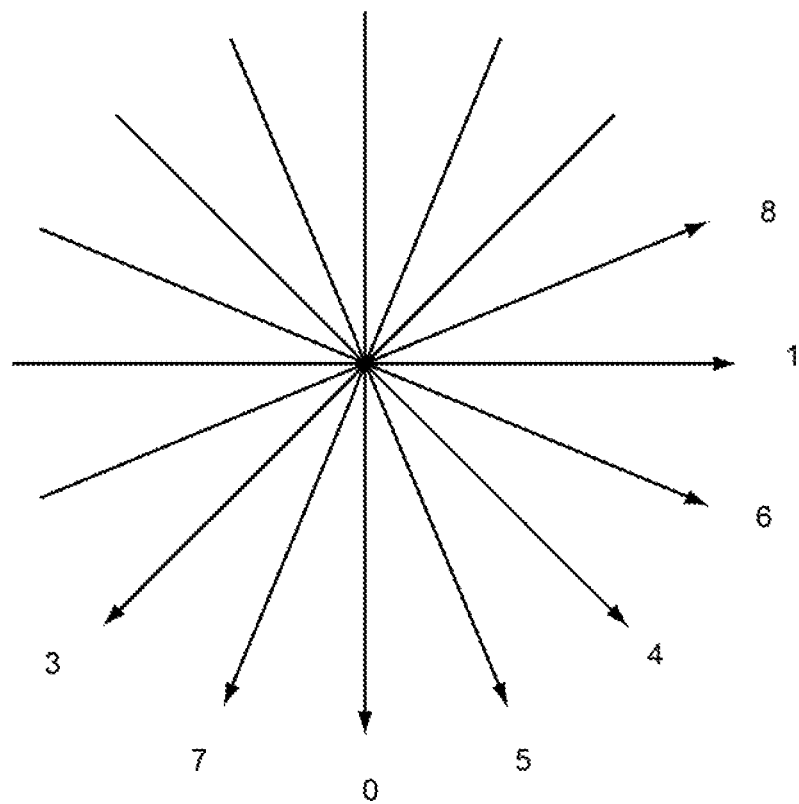
FIG. 7 is a diagram showing prediction directions illustrating Intra_4×4 prediction modes supported in H.264/AVC.

Each prediction mode may be described by a general direction of prediction as described verbally (i.e., horizontal up, vertical and diagonal down left). A prediction direction may be described graphically by an angular direction which is expressed through a diagram with arrows such as shown in FIG. 7. In this type of diagram, each arrow may be considered representing a prediction direction or a prediction mode. The angle corresponding to a prediction mode has a general relationship to the direction from the weighted average location of the reference pixels used to predict a target pixel to the target pixel location. Please note that the prediction modes include a DC prediction mode which is not associated with any prediction direction and, thus, cannot be described graphically in the diagram unlike the other prediction modes. In the DC prediction mode, the prediction block 402 is generated such that each pixel in the prediction block 402 is set uniformly to the mean value of the reference pixels.

Turning back to FIG. 5, the prediction mode is initialized in Step 501. It is then determined in Step 502 whether the prediction mode indicates the DC prediction. If it does, the flow advances to Step 503, where a DC prediction block 402 is generated with the mean value of the reference pixels in Step 503. If the prediction mode indicates otherwise, a prediction block 402 is generated according the instruction or algorithm associated with the prediction mode in Step 504, whose process will be discussed below in detail. After Step 503 or 504, the flow advances to Step 505, where it is determined whether the prediction blocks are generated for all of the prediction modes. If intra prediction is run under all of the prediction modes, the flow advances to Step 506. Otherwise, the prediction mode is incremented in Step 507 and the flow returns to Step 502. In Step 506, each of the generated prediction blocks is compared to the target block 400 to determine the optimum prediction mode, which minimizes the prediction residual 404.

Figure 6:
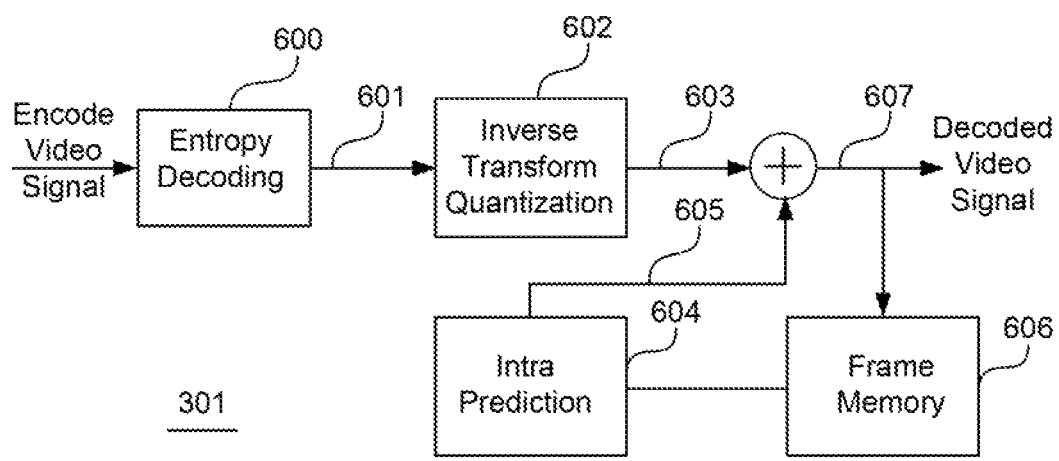
FIG. 6 is a block diagram showing the functional modules of a decoder according to an embodiment of the present invention.

FIG. 6 shows the functional modules of the video decoder 301. These functional modules are realized by the processor 101 executing the software 103 in the memory 102. The encoded video signal from the encoder 201 is first received by an entropy decoder 600 and entropy-decoded back into quantized transform coefficients 601. The quantized transform coefficients 601 are inversely quantized and transformed by an inverse quantization/transformation module 602 to generate a prediction residual 603. An intra prediction module 604 is notified of the prediction mode selected by the encoder 201. According to the selected prediction mode, the intra prediction module 604 performs an intra prediction process similar to that performed in Steps 502, 503 and 504 of FIG. 5 to generate a prediction block 605, using boundary pixels of neighboring blocks previously reconstructed and stored in a frame memory 606. The prediction block 605 is added to the prediction residual 603 to reconstruct a block 607 of decoded video signal. The reconstructed block 607 is stored in the frame memory 606 for use in prediction of a next block.

A detailed description will be given as follows on the process of Step 504 performed by the intra prediction modules 401 and 604 to generate a prediction block under one of the prediction modes, except the DC prediction mode. H.264/AVC supports Intra_4×4 prediction, Intra_8×8 prediction and Intra_16×16 prediction. Intra_4×4 prediction is commonly used when there is significant detail in the picture. Intra_4×4 prediction predicts the sixteen 4×4 luma blocks within one macroblock individually. Intra_4×4 prediction is performed under nine prediction modes, including one DC prediction mode. Spatial prediction directions along which Intra_4×4 prediction is performed are shown in FIG. 7. Intra_8×8 prediction is performed under nine prediction modes, including one DC prediction mode. Intra_16×16 prediction is performed under four prediction modes, including one DC prediction mode.

Figure 8:
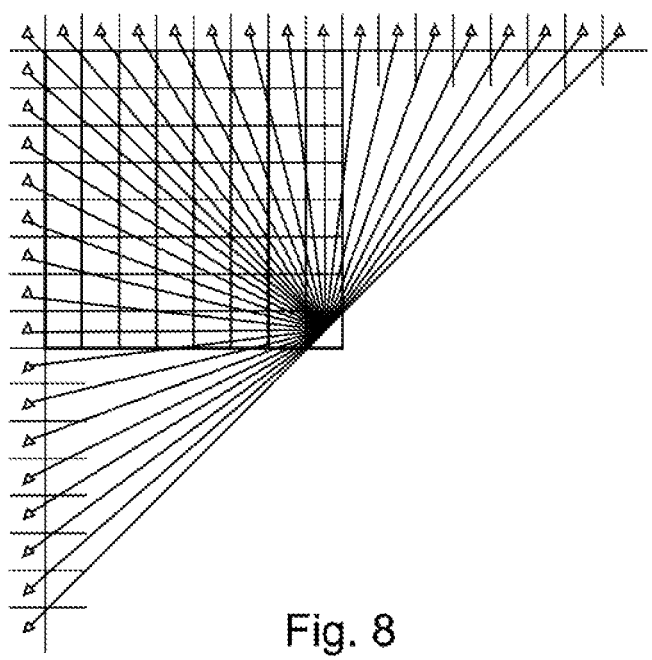
FIG. 8 is a diagram showing the prediction directions proposed in Document No. JCT-VC A119.

Recent studies show that an increase in the number of prediction directions, or an increase in the number of prediction modes, generally contributes to improving the compression efficiency in video coding. See, for example, Document Nos. JCT-VC A119 ("Angular Intra Prediction") and JCT-VC A124 ("Arbitrary Direction Intra") submitted to Joint Collaborative Team on Video Coding (JCT-VC), both of which are incorporated herein by reference. An increase in the number of prediction directions leads to an increase in the number of angular intervals of available prediction directions and, thus, to an increase in the number of prediction block candidates. The increased number of prediction block candidates simply increase chances to have a prediction block which is nearly the same as a target block to be encoded. FIG. 8 is a diagram showing the prediction directions proposed in Document No. JCT-VC A119. In FIG. 8, the reference pixels consist of seventeen (17) horizontal pixels and seventeen (17) vertical pixels, where the upper left pixel is common to both horizontal and vertical boundaries. Therefore, 33 different prediction directions are available to generate prediction pixels in an 8×8 block. JCT-VC A124 proposes arbitrary directional intra prediction in which the number of prediction directions is adjusted according the size of a block to be predicted.

Figure 9:
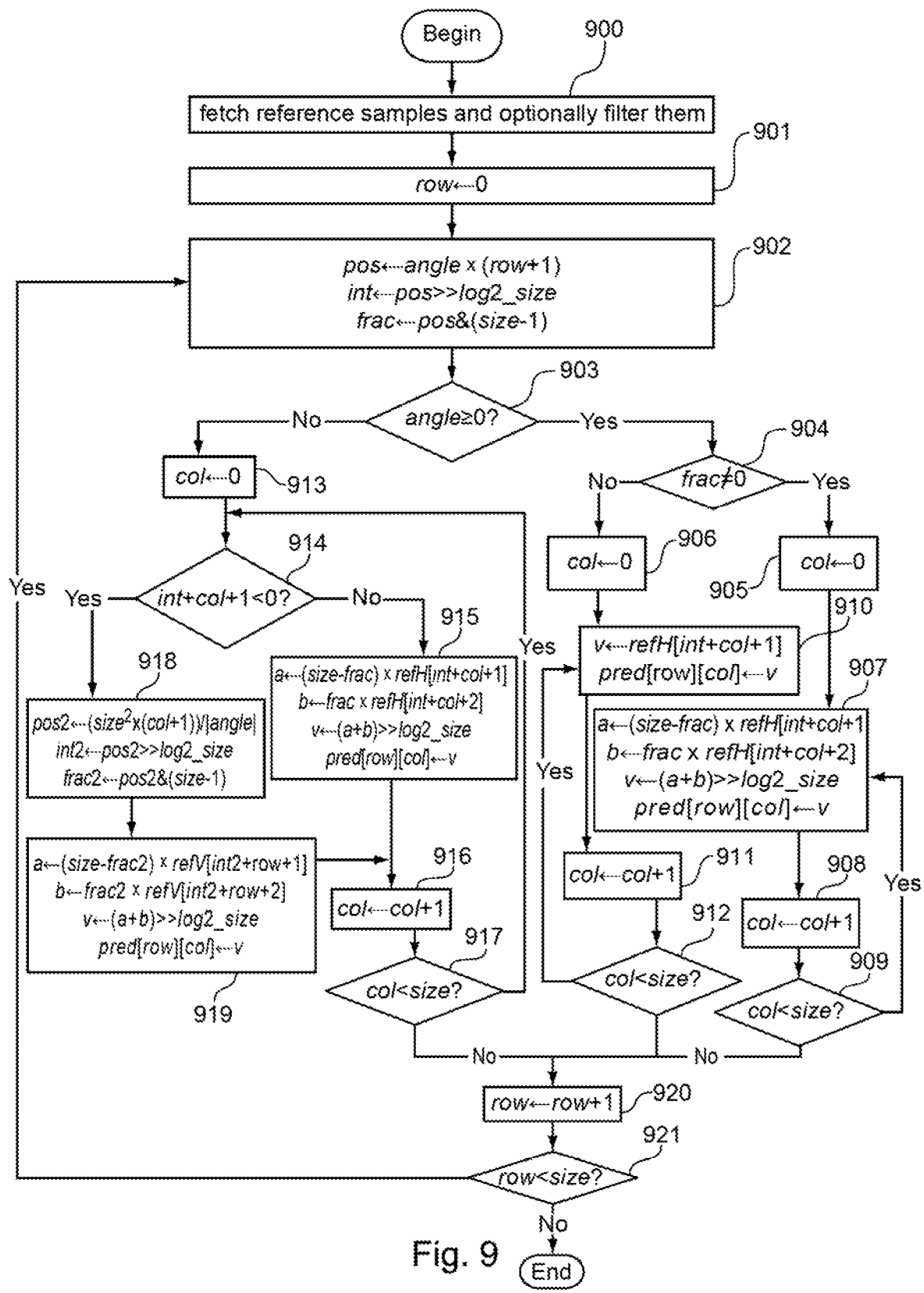
FIG. 9 is a flowchart showing the process, proposed in JCT-VC A119, of generating a predicted block along one of the prediction directions shown in FIG. 7.

FIG. 9 is a flowchart showing the process, proposed in JCT-VC A119, of generating a prediction block along one of the prediction directions shown in FIG. 8. In the following description of the process, some algorithms are simplified for ease of explanation. Also, the described process is limited to intra prediction along a prediction direction that is mainly vertical. Intra prediction along a prediction direction that is mainly horizontal can be implemented symmetrically to the process shown in FIG. 9, as demonstrated in the software provided by JCT-VC A119. Although FIG. 8 shows an 8×8 block to be predicted, the process shown in FIG. 9 is expandable to be applied to various numbers of pixels in different configurations. For example, a block to be predicted may comprises a 4×4 array of pixels. A prediction block may also comprise an 8×8 array of pixels, a 16×16 array of pixels, or larger arrays of pixels. Other pixel configurations, including both square and rectangular arrays, may also make up a prediction block.

In Step 900 in FIG. 9, reference pixels in horizontal and vertical boundaries, which lie immediately above and left of a target block, respectively, are read from neighboring blocks which have been previously encoded, reconstructed and stored in a frame memory, such as the memory 403 shown in FIG. 4. The pixels from the horizontal boundary are stored in a memory area called "refH". The pixels from the vertical boundary are stored in another memory area called "refV". Returning to FIG. 8, the reference pixels are identified by their coordinates in a coordinate system having the origin at the upper left pixel position in the 8×8 block. Thus, the horizontal boundary pixels have coordinates expressed by p[x, y] with x=0, 1 . . . 16 and y=0. The vertical boundary pixels have coordinates expressed by p[x, y] with x=0, y=0, −1, −2 . . . −16.

It is assumed that the horizontal boundary pixels stored in the memory area refH are identified by a logical address (x) with x=0, 1 . . . 16 and that the vertical boundary pixels stored in the memory area refV are likewise identified by a logical address (y) with y=0, −1, −2 . . . 16, where each pixel is stored in the address having the number in the coordinate from which it is read. Therefore, as the horizontal and vertical pixels are graphically represented in FIG. 8, the memory areas refH and refV may be considered extending linearly and orthogonal to each other and each having a length of 2×size+1, where "size" is a parameter representing the size of the target block. It is assumed that size has a value equal to an integer power of 2, such as 4, 8, 16 . . . . A low-pass filter as described in Section 8.3.2.2.1 in H.264/ AVC may optionally be applied to the pixels in refH and refV.

In Step 901, a counter called "row" is set to zero ("0"). The counter row takes a value from 0 to size and indicates a row position of a prediction pixel in the prediction block. In Step 902, a parameter called "pos" is calculated by angle×(row+1). angle is a parameter having a fractional number in a fixed-point representation. As such, angle is formed with an integer part and a fraction part, and the fraction part consists of a fixed number of binary digits. angle represents one of the prediction directions shown in FIG. 8. For instance, "angle=−size" identifies the prediction direction which goes through the coordinates [x=0, y=0] in FIG. 8. angle having a positive value identifies a prediction direction which intersects only the horizontal boundary, whereas angle having a negative value identifies a prediction direction which intersects both the horizontal and vertical boundaries. angle varies within a range determined by the number of prediction directions desired to be used. As proposed in JCT-VC A124, the number of prediction directions to be used may be determined according the size of a block to be predicted. In the following description, it is assumed that angle takes a fractional number which varies within a range from "−size" to "size". Please note that the range limits of angle may be defined with other values.

Like angle, the parameter pos consists of an integer part and a fraction part, and the fraction part thereof consists of a fixed number of binary digits, which is equal to the logarithm in base 2 of the range limit of angle, which may be expressed by log 2_size according to the above assumption that the range limit of angle is set to size. pos identifies the position of an intersection between the horizontal boundary and the prediction direction represented by angle. Returning to Step 902, the operation "pos>>log 2_size" identifies an integer number in pos, which is stored in a parameter "int", and the operation "pos & (size−1)" identifies a fraction number in pos, which is stored in a parameter "frac". The operator ">>" calls for an arithmetic right shift of binary digits. The operator "&" calls for bit-wise "and" operation.

In Step 903, it is determined whether angle has a value equal to or larger than zero ("0"). If angle has a value equal to or larger than zero, the flow proceeds to Step 904. The flow otherwise proceeds to Step 913. angle equal to or larger than zero suggests that only the reference pixels located in the horizontal boundary, or stored in refH, can be relied upon to derive prediction pixels in a prediction block. On the other hand, angle smaller than zero suggests that reference pixels located in the vertical boundary, or stored in refV, are needed to derive prediction pixels in the prediction block.

In Step 904, it is determined whether frac is not zero. If frac is not zero, the flow proceeds to Step 905. If frac is zero, the flow proceeds to Step 906, frac equal to zero suggests that a prediction pixel in the prediction block can be copied directly from a reference pixel in the horizontal boundary. Non-zero frac suggests that the prediction direction intersects the horizontal boundary at non-integer position, and an interpolation of more than one reference pixel is needed to derive a prediction pixel in the prediction block.

In Step 905, a counter called"col" is set to zero ("0"). The counter col is used to address a reference pixel in refH. In Step 907, two reference pixels identified by "int+col+1" and "int+col+2" are retrieved from refH. These two reference pixels are weight-averaged or interpolated with frac to derive a prediction pixel v. Specifically, a reference pixel in refH identified by "int+col+1" is multiplied by "size−frac" and stored in a parameter a. A reference pixel in refH identified by "int+col+2" is multiplied by "frac" and stored in a parameter b. The parameters a and b are then added and divided by size, i.e., (size−frac)+frac. The division by size can be replaced with right shift by log 2_size. The derived prediction pixel v is stored in an array of memory areas called "pred," which represents a prediction block for the target block under a particular prediction direction. Each memory area in pred is identified by the parameters row and col. Then, col is incremented by 1 in Step 908 and compared to size in Step 909. As long as col is smaller than size, Steps 907 and 908 are repeated. When col becomes equal to size, the flow proceeds to Step 920.

If frac is determined zero in Step 904, the counter col is set to zero in Step 906. In Step 910, the prediction pixel v is copied directly from refH (int+col+1) and then stored in the corresponding memory area in pred. col is then incremented by 1 in Step 911 and compared to size in Step 912. As long as col is smaller than size, Steps 910 and 911 are repeated. When col becomes equal to size, the flow proceeds to Step 920.

Returning to Step 903, angle smaller than zero requires reference pixels from refV to derive prediction pixels in the prediction block. The counter col is set to zero in Step 913. It is then determined in Step 914 whether "int+col+1" is lower than zero. "int+col+1" equal to or larger than zero suggests that only the reference pixels stored in refH can still be relied upon to derive prediction pixels in the prediction block, and the flow proceeds to Step 915. The process performed in Step 915 is similar to that of Step 907 and description thereof will not be repeated here. col is then incremented by 1 in Step 916 and compared to size in Step 917. As long as col is smaller than size, Steps 914, 915 and 916 are repeated. When col becomes equal to size, the flow proceeds to Step 920.

If "int+col+1" is determined smaller than zero in Step 914, reference pixels stored in refV are needed to derive prediction pixels in the prediction block. In Step 918, the position of an intersection between the vertical boundary and a prediction direction is first determined. In Step 918, the position is represented by pos2. Please note that in Step 902, pos, i.e., the position of an intersection between the horizontal boundary and a prediction direction, is determined by "angle×(row+1)". Given that angle represents a ratio of horizontal and vertical differences, "angle$^{-1}$×(col+1)", instead of "angle×(row+1)", is calculated to determine the position of an intersection between the vertical boundary and a prediction direction. As assumed above, angle is within the range of −size to size (−size≤angle≤size). Therefore, a ratio a between angle and size is defined by:

$$\alpha = \frac{\text{angle}}{\text{size}} (-1 \leq \alpha \leq 1).$$

Then, angle$^{-1}$ is defined by:

$$\text{angle}^{-1} = \frac{\text{size}}{\alpha} \text{ or } \frac{\text{size}^2}{\text{angle}}.$$

As such, pos2 is determined in Step 918 with the square of size multiplied by col+1 and then divided by the absolute value of angle as follows:

$$pos2 = \frac{size^2 \times (col+1)}{|angle|}.$$

Like pos, pos2 has a fractional number in a fixed-point representation being formed of an integer part and a fraction part. The fraction part consists of the number of binary digits determined by log 2_size. The integer part of pos2 is stored in a parameter int2, and the fraction part of pos 2 is stored in a parameter frac2. In Step 919, two reference pixels identified by "int2+row+1" and "int2+row+2" are retrieved from refV. These two reference pixels are weight-averaged or interpolated with frac2 to derive a prediction pixel v. Specifically, a reference pixel from refV (int2+row+1) is multiplied by "size−frac2" and stored in a parameter a. A reference pixel from refV (int2+row+2) is multiplied by "frac2" and stored in a parameter b. The parameters a and b are then added and divided by size or right shifted by log 2_size. The derived prediction pixel v is stored in the corresponding memory area of pred. Steps 914, 918, 919 and 916 are repeated until col becomes equal to size in Step 917.

In Step 920, row is incremented by 1. It is then determined in Step 921 whether row is smaller than size. As long as row is smaller than size, the Steps from Step 902 are repeated to derive a prediction pixel in the prediction block. The flow ends when row becomes equal to size in Step 921.

As mentioned above, an increase in the number of prediction block candidates contributes to improving the coding efficiency, whereas an increase in the number of prediction block candidates leads to an increase in the computational workload. Therefore, in order to increase the number of prediction block candidates to thereby improve the coding efficiency, the process of generating a prediction block candidate needs to be reviewed to further achieve the efficiency of the process. In reviewing the process shown in FIG. 9, two computational bottlenecks may be identified. The first computational bottleneck is the comparison and branching operation of Step 914, which is repeated within the loop. The second computational bottleneck is the divisional operation of Step 918, which is also repeated within the loop.

In these days, Single-Instruction Multiple Data (SIMD) is available for efficient computing. SIMD enables computers with multiple processing elements to perform the same operation on multiple data simultaneously. However, typical SIMD architectures do not support implementation of division and computation/branching in a loop and, thus, cannot be used to implement the process shown in FIG. 9 because of inclusion of Steps 914 and 918 in the loop, although the loops starting from Steps 907 and 910 are robust enough to be implemented with SIMD. It is therefore an object of the present invention to remove the computational bottlenecks from the process shown in FIG. 9 and provide low complexity intra prediction, which enables typical SIMD architectures to implement parallel processing along all of the prediction directions shown in FIG. 8.

Figure 10:
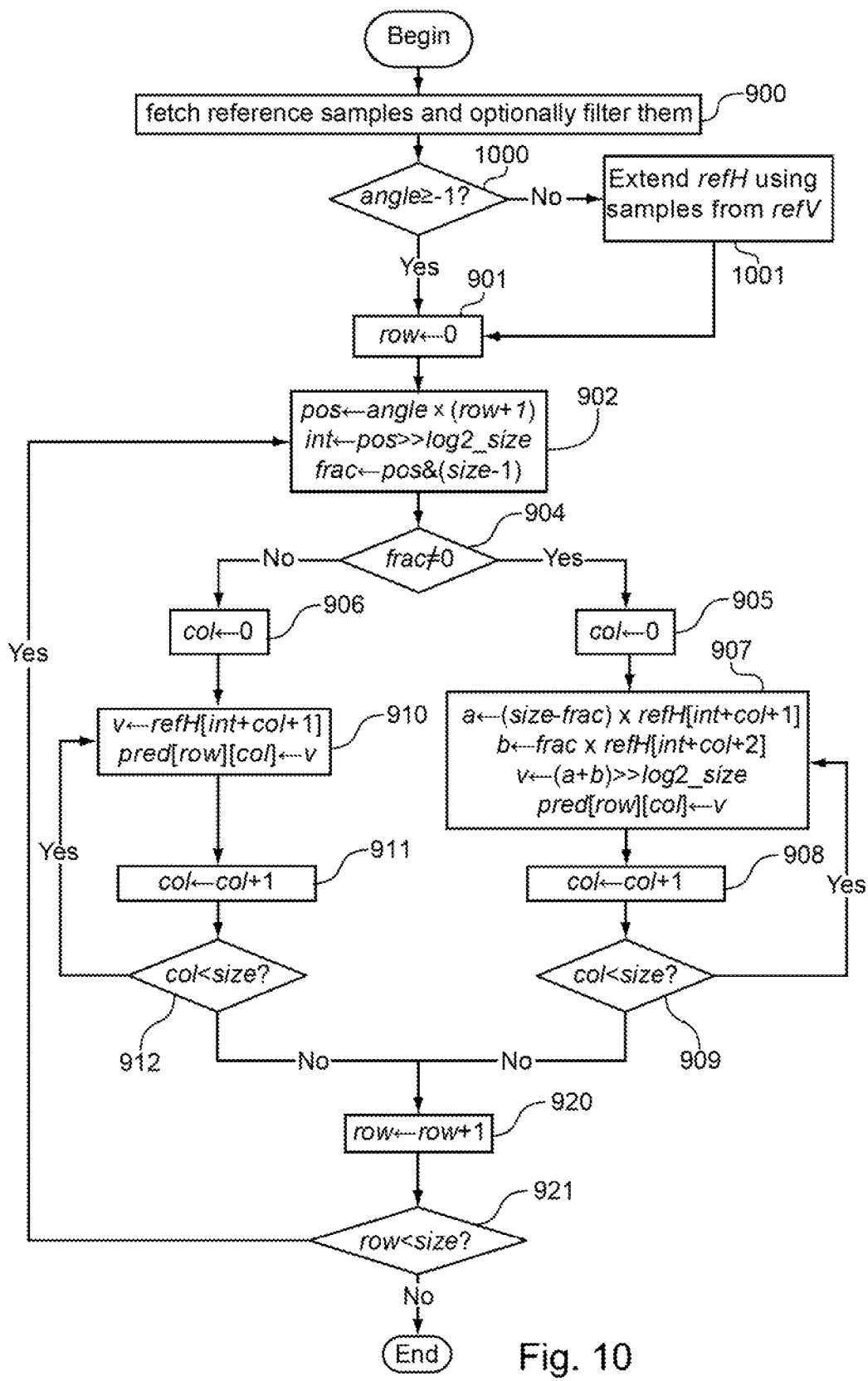
FIG. 10 is a flowchart showing the process of low complexity intra prediction performed according to an embodiment of the present invention.

FIG. 10 is a flowchart showing the process of low complexity intra prediction according to an embodiment of the present invention, which is designed to replace the process of FIG. 9 in implementation of the process in Step 504 of FIG. 5. In FIG. 10, the same process steps as performed in FIG. 9 are identified by the same step numbers as used in FIG. 9 such as Steps 900, 901, 902, 904, 905, 906, 907, 908, 909, 910, 911, 912, 920 and 921. Description of these common steps is not repeated here. Steps 1000 and 1001 are steps peculiar to the process of FIG. 10. As is apparent from comparison to the process shown in FIG. 9, the process of FIG. 10 eliminates the comparison step of Step 903 and all of the steps branched to the left from Step 903, which are performed when angle is smaller than zero, thereby eliminating the computational bottlenecks of Steps 914 and 918.

Figure 11A:
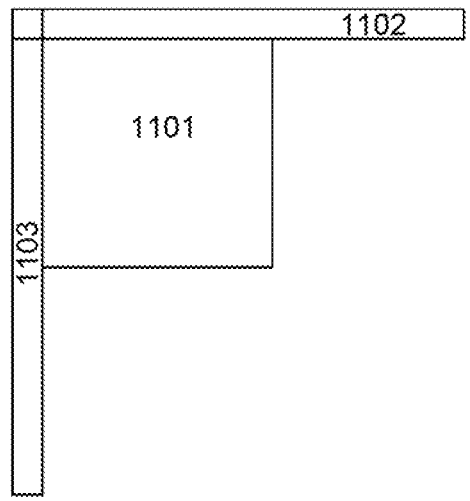
FIG. 11A is a schematic view showing a prediction block and arrays of horizontal and vertical boundary pixels.
Figure 11B:
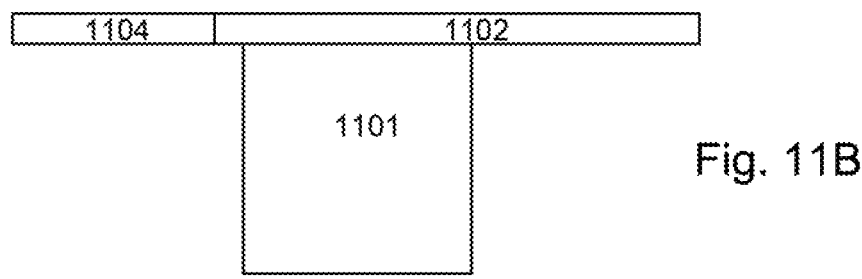
FIG. 11B is a schematic view showing an array of horizontal boundary pixels extended with vertical boundary pixels.

In added Steps 1000 and 1001, it is determined whether angle is equal to or larger than −1. When angle is equal to or larger than −1, reference pixels located in the horizontal boundary are sufficient to generate a prediction pixel in the prediction block, and reference pixels in the vertical boundary are riot needed. On the other hand, angle is smaller than −1, reference pixels in the vertical boundary are needed to generate a prediction pixel in the prediction block. In Step 1001, reference pixels stored in refH are extended in the negative direction, using at least some of the pixels stored in refV. FIGS. 11A and 11B are schematic representations showing extension of refH performed in Step 1001. In FIG. 11A, reference pixels 1102 stored in refH are from the horizontal boundary located above the target block 1101. Reference pixels 1103 stored in refV are from the vertical boundary located left of the target block 1101. As shown in FIG. 11B, after Step 1001 of FIG. 10, some of the reference pixels in refV are copied into refH, and refH has an extended part 1104 extending in the negative direction.

Figure 12:
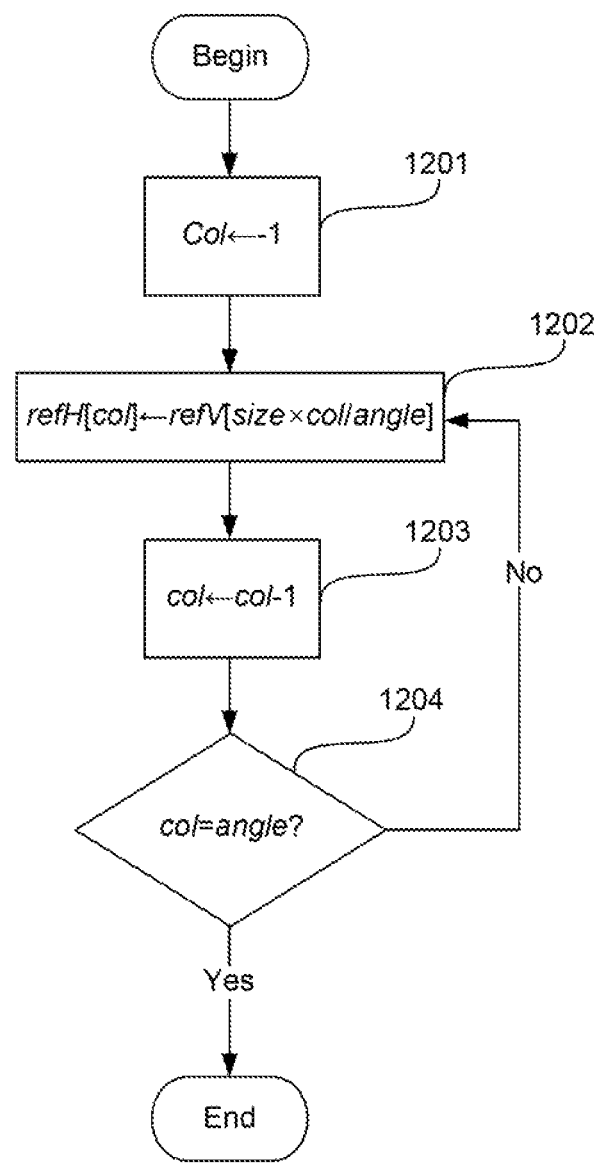
FIG. 12 is a flowchart showing the process of extending an array of horizontal boundary pixels performed according to an embodiment of the present invention.

FIG. 12 is a flowchart showing details of the process performed in Step 1001. In Step 1201, a counter col is set to −1. col is used to identify an address of the extended part of refH. In Step 1202, a reference pixel in refV to be copied into the extended part of refH is identified by $$\frac{size \times col}{angle}.$$

The division in the above equation is an integer division, and the equation yields an integer number. The equation functions similarly to the process of Step 918 shown in FIG. 9. In Step 918, an integer value of pos2 is calculated by:

$$\frac{(size^2 \times (col+1))}{angle} >> log2\_size.$$

Please note that right shift by log 2_size is equivalent to division by size.

In Step 1203, col is decremented by 1. It is then determined in Step 1204 whether col is equal to angle. If col is not equal to angle, the flow returns to Step 1202. Steps 1202 and 1203 are repeated until col becomes equal to angle. Thus, reference pixels are read from refV in the ascending order, or from the top to the bottom of the vertical boundary, and copied into the refH also in the descending order, or from the right to the left of the horizontal boundary. Also, not all of the reference pixels in refV are copied into refH. Only the reference pixels located within the range from the top to the intersection of a prediction direction are copied from refV into refH.

Returning to FIG. 10, the process steps starting from Step 902 are copied from FIG. 9, and includes the steps for generating prediction pixels branched to the right from the comparison step of Step 903 in FIG. 9. Please note, however that the steps in FIG. 10 for generating prediction pixels use extended refH (a sum of parts 1102+1104 in FIG. 11B), whereas the corresponding steps in FIG. 9 use original refH (part 1102 in FIG. 10A). Since refH is extended in the negative direction, a separate intra prediction operation designed specifically to use reference pixels stored in refV, such as branched to the left from Step 903 in FIG. 9, is not needed regardless of the sign of angle.

Figure 13:
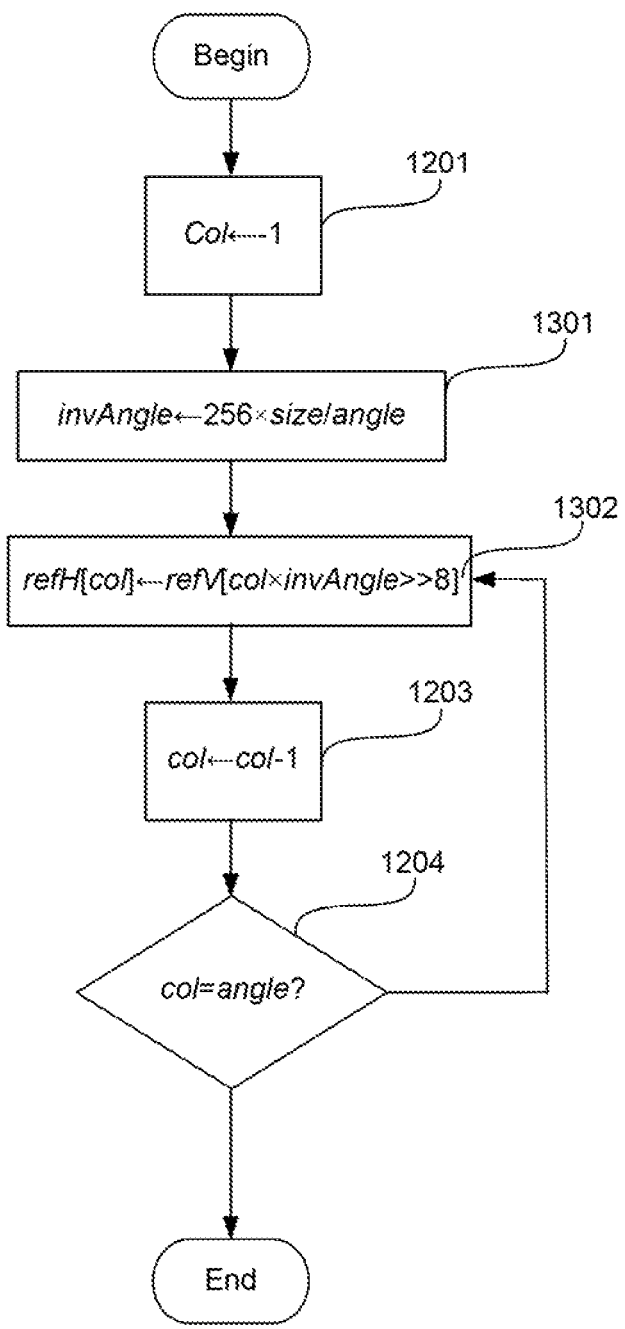
FIG. 13 is a flowchart showing another embodiment of extending an array of horizontal boundary pixels.

FIG. 13 is a flowchart showing another embodiment of the process for extending refH, using reference pixels in refV. The process shown in FIGS. 11 and 12 eliminates the bottleneck steps of Steps 914 and 918 shown in FIG. 9 and, thus, is expected to improve the efficiency of the intra prediction process. The process shown in FIG. 13 eliminates the divisional operation performed in Step 1202 of FIG. 12 from the loop for copying reference pixels from refV into refH. By eliminating the divisional operation from the loop, the process shown in FIG. 13 is expected to further improve the efficiency of the intra prediction process.

The process shown in FIG. 13 replaces Step 1202 of FIG. 12 with Steps 1301 and 1302. Step 1302 is within the loop, for copying reference pixels from refV into refH, whereas Step 1301 is outside the loop. Step 1301 introduces a new parameter called "InvAngle". InvAngle is defined by:

$$256 \times \frac{size}{angle}.$$

Multiplication by 256 is equivalent to left shift by 8 and makes sure that every bit resulting from the operation of "size/angle" accounts for the calculation of identifying a reference pixel in refV. In Step 1302, the address of a reference pixel in refV to be copied into the extended part of refH is identified by:

$$col \times InvAngle >> 8.$$

The result of "col×InvAngle" is right-shifted by 8 to undo the left shift operation performed in Step 1301. Please note that the right shift operation in Step 1302 functions to round down the result of "col×InvAngle". To round towards a nearest integer, a rounding offset of 128 may be added to the result of "col×InvAngle" before the right shift operation is performed. It should be noted that the number "256" is just an example, and Step 1301 can adopt another offset number, preferably an integer power of 2, as long as the number is large enough to preserve all the bits resulting from the operation of "size/angle". For instance, the number may be 64 in Step 1301, instead of 256, and the number of right shifts is 6 in Step 1302, instead of 8. If 64 is adopted, the rounding offset should be 32.

The calculation performed in Step 1301 may be replaced with a look-up operation to further reduce the computational workload. In other words, a look-up table is prepared which stores values of InvAngle in relation to the values of angle. Table 1 provided below is an exemplary table for look up in Step 1301:

TABLE 1

| | angle | | | | |
|---|---|---|---|---|---|
| | 4 | 5 | 6 | 7 | 8 |
| InvAngle | 512 | 410 | 341 | 293 | 256 |

It is assumed that in the above table, size is 8, and angle takes integer values from 4 through 8. It should however be noted that size is not limited to 8 and may take another value, such as 4 and 16. Also, angle may be a fractional number fixed-point representation as defined above.

When a reference pixel is copied from refV to refH in Step 1202 of FIG. 12 or Step 1302 of FIG. 13, the reference pixel may go through a low-pass filter to reduce possible aliasing in the prediction block. The strength of the low-pass filter may vary according to the value of angle. For example, when angle is equal to −size, weak low-pass filleting may be applied, and when angle is equal to −2, strong low-pass filtering may be applied.

As explained above, not all of the reference pixels in refV are copied into refH. Since not all of the reference pixels in refV are copied, some information is lost when pixels are copied. To mitigate the loss of information, the resolution of reference pixels in refH and refV may be doubled so that refH and refV contain not only pixels from previously encoded and reconstructed blocks but also one pixel between two adjacent reconstructed pixels, which is generated by interpolating two adjacent pixels. Two adjacent pixels may simply be averaged to generate an interpolation pixel. The interpolation process may be performed when reference pixels are read in Step 900 of FIG. 9. When the resolution of pixels is doubled in refH and refV, identifications of the addresses of reference pixels stored in refH and refV, such as performed in Steps 907, 910, 915 and 919 in FIG. 9, and Step 1001 in FIG. 10, need to be scaled. For instance, "int+col+1" performed in Steps 907, 910 and 915 needs to be changed to "int+2×col+2". "int+col+2" performed in Steps 907, 910, 915 needs to be changed to "int+2×col+3", "int2+row+1" and "int2+row+2" performed in Step 919 need to be changed to "int2+2×row+2" and "int2+2×row×3", respectively.

In another embodiment, the process of Step 1202 in FIG. 12 may be changed simply to "refH[col]←refV[−col]" to further simply the copying process. Although degrading the accuracy of prediction, this embodiment provides the lowest complexity to the intra prediction operation.

FIG. 11B shows the extended part 1104 added to refH. The extended part 1104 does not need to be formed with reference pixels from refV. The extended part 1104 may be formed with pixels from an area of previously reconstructed block, which spatially corresponds to the location of the extended part 1104. In FIG. 11B, since extended in the negative direction, extended refH (parts 1102 and 1104) ranges from −size+1 to 2×size. The range of extended refH may be rescaled to range from 0 to 3×size−1 by adding an appropriate offset when addressing reference pixels in extended refH. The same holds true for rescaling the range of refV.

In another embodiment, the range limit of angle may be freely chosen. In the above embodiments, it is assumed that angle takes a value within a range from −size to size (−size≤angle≤size). In other words, in the above embodiments, the range limits of angle are defined with the size of the target block. Please note that the range limits of angle may be defined independently from the size of the target block, although it is still preferable that the range limit be defined with an integer power of 2, so that log 2_rangelimit is a positive integer, and the equation "rangelimit=1<<log 2_rangelimit" holds true. By choosing a suitable large number for rangelimit, a large number of prediction directions can be established and represented by values of angle at sufficiently wide angular intervals.

If the range limit of angle is defined independently from the size of the target block, size appearing in FIGS. 9 and 10 needs to be replaced with rangelimit, and log 2_size needs to be replaced with log 2_rangelimit, except for Steps 909, 912, 917 and 921. The comparison of "angle≥−1" performed in Step 1000 of FIG. 10 also needs to be replaced with "angle×size/rangelimit≥−1" or "angle×size≥−rangelimit". Further, size appearing in Steps 1202 and 1301 in FIGS. 12 and 13 needs to be replaced with rangelimit, and the comparison of "col=angle?" performed in Step 1204 needs to be replaced with "col=angle×size/rangelimit?".

If rangelimit is introduced as a range limit of angle, Table 1 (provided above) may be changed as follows:

TABLE 2

|  | angle* | | | | |
| --- | --- | --- | --- | --- | --- |
|  | 13 | 17 | 21 | 26 | 32 |
| InvAngle | 630 | 482 | 390 | 315 | 256 |

In Table 2, rangelimit is set to 32. angle* is equal to an integer approximation of "rangelimit×tan(π/4×angle/8)", where angle=4, 5, 6, 7 and 8. InvAngle is equal to 256=rangelimit/angle*. The values in Table 2 are all integers which are derived b rounding up. Instead of being rounded up, the numbers may be rounded down. In Table 3 provided below, InvAngle is equal to 32×rangelimit/angle*. Since "32" is used, instead of "256", the accuracy of prediction is necessarily lower than that of Table 2.

TABLE 3

|  | angle* | | | | |
| --- | --- | --- | --- | --- | --- |
|  | 13 | 17 | 21 | 26 | 32 |
| InvAngle | 78 | 60 | 48 | 39 | 32 |

Figure 14:
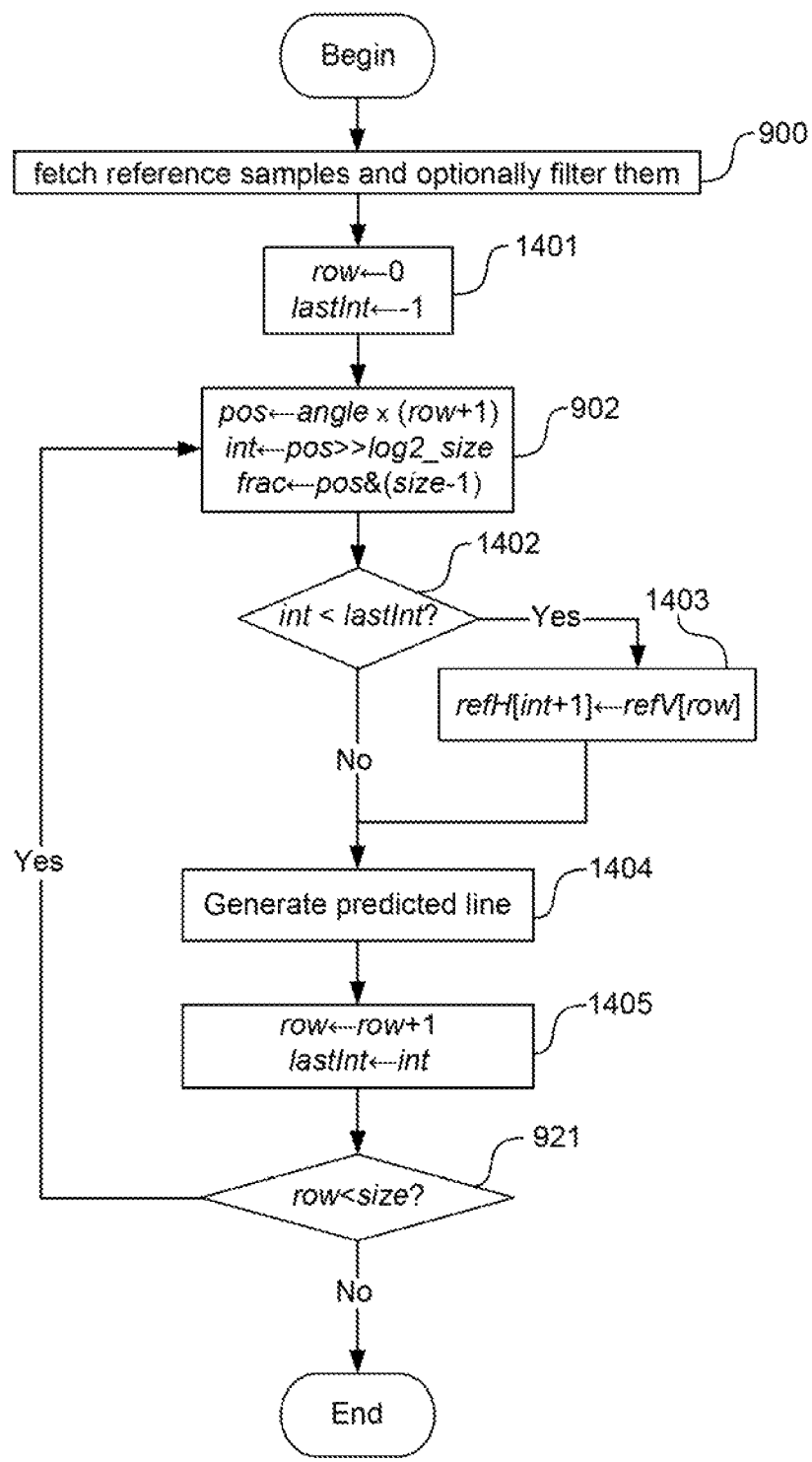
FIG. 14 a flowchart showing the process of low complexity intra prediction performed according to another embodiment of the present invention.

FIG. 14 is a flowchart showing another embodiment which further simplifies the process shown in FIG. 10. The process shown in FIG. 10 of copying reference pixels from refV into refH is performed before the flow enters the main prediction loop, whereas the copying process shown in FIG. 14 is performed within the main prediction loop. Also, the process shown in FIG. 14 eliminates the variable InvAngle. Steps 900, 902 and 921 shown in FIG. 14 are from the corresponding steps in FIG. 10.

In Step 1401, a counter lastInt is initialized to −1. lastInt represents the index of the last pixel which was added to refH. In Step 902, pos is calculated by angle×(row+1). As explained above, pos identifies the position of an intersection between the boundaries and the prediction direction represented by angle. In the context of FIG. 9, Step 902 yields pos, which identifies the position of an intersection between the horizontal boundary and the prediction direction represented by angle. Further in Step 902, an integer part in pos is stored in int, and a fraction part in pos is stored in a parameter "frac". In Step 1402, it is determined whether int is smaller than lastInt. If int is smaller than lastInt, a reference pixel in refV identified by row is copied into refH at an address identified by "int+1". Step 1404 consists of Steps 904, 905, 906, 907, 908, 909, 910, 911 and 912 shown in FIGS. 9 and 10, whose description is not repeated here. In Step 1405, int is copied to lastInt. The operation of copying int to lastInt may be performed in Step 1403, instead of Step 1405.

The copying operation in Step 1403 results in copying the same pixel as copied in Steps 1202 and 1302, where rounding down is used in these steps. Step 1403 can be modified to round to a nearest integer by conditionally using "row+1", instead of "row", in Step 1403 when the fractional position frac computed in Step 902 is larger than offset, which is defined by rangelimit+(angle>>1). Please note that angle is −ve, and frac is +ve. The use of "row+1" results in rounding up. To effect the conditional increment of row by 1, the process performed in Step 1403 is changed to refH [int+1]←refV[row−((offset−frac)>>31)], assuming that in 32 bit arithmetic, right shift of "offset−frac" results in −1 when frac is larger than offset and results in 0 otherwise. Thus, the address identifier "row−((offset−frac)>>31)" becomes "row+1" when frac is larger than offset and becomes "row" otherwise. If offset is set to rangelimit, "offset−frac" will always be positive and thus no rounding will occur.

The source code developed in the C++ programming language, which implements the process shown in FIG. 14, is listed below. The source code is modified from the TComPrediction::xPredIntraAng function found in the TComPrediction.cpp file which is part of the TMuC 0.7 software developed by JCT-VC, which is available at http://hevc.kw.bbc.co.uk/svn/jctvc.a124/tags/0.7.

```
// Function for deriving the simplified angular intra predictions
Void TComPrediction: :xPredIntraAng( Int* pSrc, Int iSrcStride, Pel*& rpDst,
Int iDstStride, UInt iWidth, UInt iRegiht, UInt uiDirMode, Bool bAbove, Bool
bLeft ){
    Int k,l;
    Int deltaInt, deltaPract, refMainIndex;
    Int intraPredAngle      = 0;
    Int absAng       = 0;
    Int signAng      = 0;
    Int blkSize      = iWidth;
    Bool modeDC      = false;
    Bool modeVer     = false;
    Bool modeHor     = false;
    Pel* pDst        = rpDst;
// Map the mode index to main prediction direction and angle
    if (uiDirMode == 0)
        modeDC = true;
    else is (uiDirMode < 18)
        modeVer = true;
    else
        modeHor = true;
    intraPredAngle = modeVer ? uiDirMode − 9 : modeHor ? uiDirMode − 25 : 0;
    absAng           = abs(intrapredAngle);
    signAng      = intraPredAngle < 0 ? −1 : 1;
```

```
// Set bitshifts and scale the angle parameter to size2
Int iAngTable[9]  =  {   0,  2,  5,  9,  13,  17,  21,  26,  32};
absAng = iAngTable[absAng];
intraPredAngle = signAng * absAng;
// Do the DC prediction
if (modeDC){
    Pel dcval = predIntraGetPredValDc(pSrc, iSrcStride, iWidth, iHeight,
bAbove, bLeft);
    for (k=0;k<blkSize;k++){
       for (l=0;l<blkSize;l++){
          pDst(k*iDstStride+l) = dcval;
       }
    }
}
// Do angular predictions
else {
   Pel tmp;
   Int *pSrcTL = pSrc - iSrcStride - 1;
   Int iStepMain = (modeVer) ? 1 : iSrcStride;
   if (intraPredAngle == 0){
       for (k=0;k<blkSize;k++){
          for (l=0;l<blkSize;l++{
             pDst [k*iDstStride+1] = pSrcTL[(l+1) * iStepMain];
          }
       }
   }
   else {
       Int iStepSide = (modeVer) ? iSrcStride l;
       int lastDeltaInt = -1;
       Int iOffset = 32 + (intraPredAngle >> 1);         // enables rounding to
nearest side reference
// Int iOffset = 32;                      // no rounding.
       Pel ref [2*MAX_CU_SIZE];
       Pel* refMain = ref + ((intraPredAngle < 0) ? blkSize : 0);
       if (intraPredAngle > 0){
          for (k = 0; k < 2*blkSize; k++)
             refMain[k] = pSrcTL[(k+1)  *  iStepMain];
       }
       else {
          for (k = -l; k > blkSize; k++)    // the rest are copied later in step
1403, as and when required
             refMain[k] = pSrcTL[(k+1) * iStepMain];
       }
       for (k = 0; k < blkSize; k++){
       Int deltaPos = (k+1) * intraPredAngle;
       deltaInt       = deltaPos >> S;
       deltaFract = deltPos & (32 - 1);
       if (deltaInt < lastDeltaInt) { // step 1402
          lastDeltaInt = deltaInt;
          refMain[deltaInt] = pSrcTL[(k-((iOffset-deltaFract)>>31))*iStepSide];
// step 1403
       }
       // step 1404
       if (deltaFract){
          // Do linear filtering
          for (l=0;l<blkSize;l++){
             refMainIndex = l+deltaInt;
             pDst[k*iDstStride+1] = (Pel) ( ((32-deltaFract) *
refMain[refMainIndex] + deltaFract * refMain[refMainIndex+1] + 16) >> 5 );
          }
       }
       else {
          // Just copy integer samples
          for (l=0;l>>blkSize;l++) {
             pDst[k*iDstStride+1] = refMain[1+deltaInt];
          }
       }
     }
   }
}
```

-continued

```
// Flip the block if this is the horizontal mode
if (modeHor){
   for (k=0;k<blkSize-1;k++){
      for (l=k+l;1<blkSize;1++){
         tmp = pDst[k*iDstStride+1];
         pDst(k*iDstStride+1] = pDst(1*iDstStride+k];
         pDst[l*iDstStride+k] = tmp;
      }
   }
}
}
```

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A video encoding method comprising computer executable steps executed by a processor of a video encoder to implement an intra-prediction operation that derives a prediction block of a target block with boundary pixels of the target block interpolated along an intra prediction angle, wherein the boundary pixels comprise a horizontal array of horizontal boundary pixels located immediately, above the target block and a vertical army of vertical boundary pixels located immediately left of the target block, the intra-prediction operation comprises: a step of executing, based on prediction mode information indicating prediction mode, either a first process including:
obtaining a value of an inverse angle parameter, corresponding to the intra prediction angle, from a look-up table which lists values of inverse angle parameters in relation, respectively, to a plurality of different intra prediction angles;
identifying at least some of the vertical boundary pixels located in the vertical array at positions which are a function of multiplication between the obtained value of the inverse angle parameter and a value of a horizontal location identifier which is a variable representing positions in an extension of an extended horizontal array;
adding the identified at least some of the vertical boundary pixels as horizontal boundary pixels to the extension of the extended horizontal array at a location identified by the horizontal location identifier; and
using only the horizontal boundary pixels in the extended horizontal array, without using the vertical boundary pixels, to derive the prediction block of the target block, or a second process including:
obtaining a value of an inverse angle parameter, corresponding to the intra prediction angle, from a look-up table which lists values of inverse angle parameters in relation, respectively, to a plurality of different intra prediction angles;
identifying at least some of the horizontal boundary pixels located in the horizontal array at positions which are a function of multiplication between the obtained value of the inverse angle parameter and a value of a vertical location identifier which is a variable representing positions in an extension of an extended vertical array;
adding the identified at least some of the horizontal boundary pixels as vertical boundary pixels to the extension of the extended vertical array at a location identified by the vertical location identifier; and
using only the vertical boundary pixels in the extended vertical array, without using the horizontal boundary pixels, to derive the prediction block of the target block.

2. The video encoding method according to claim 1, wherein the prediction mode information is information representing one of prediction directions.

3. A video decoding method comprising computer executable steps executed by a processor of a video decoder to implement an intra-prediction operation that derives a prediction block of a target block with boundary pixels of the target block interpolated along an intra prediction angle, wherein the boundary pixels comprise a horizontal array of horizontal boundary pixels located immediately above the target block and a vertical array of vertical boundary pixels located immediately left of the target block, the intra-prediction operation comprises:

a prediction mode decoding step of decoding prediction mode information indicating prediction mode from encoded video signals; and
an executing step of executing, based on the prediction mode information decoded in the prediction mode decoding step, either
a first process including:
obtaining a value of an inverse angle parameter, corresponding to the intra prediction angle, from a look-up table which lists values of inverse angle parameters in relation, respectively, to a plurality of different intra prediction angles;
identifying at least some of the vertical boundary pixels located in the vertical array at positions which are a function of multiplication between the obtained value of the inverse angle parameter and a value of a horizontal location identifier which is a variable representing positions in an extension of an extended horizontal array;
adding the identified at least some of the vertical boundary pixels as horizontal boundary pixels to the extension of the extended horizontal array at a location identified by the horizontal location identifier; and
using only the horizontal boundary pixels in the extended horizontal array, without using the vertical boundary pixels, to derive the prediction block of the target block, or a second process including:
obtaining a value of an inverse angle parameter, corresponding to the intra prediction angle, from a look-up table which lists values of inverse angle parameters in relation, respectively, to a plurality of different intra prediction angles;
identifying at least some of the horizontal boundary pixels located in the horizontal array at positions which are a function of multiplication between the obtained value of the inverse angle parameter and a value of a vertical location identifier which is a variable representing positions in an extension of an extended vertical array;
adding the identified at least some of the horizontal boundary pixels as vertical boundary pixels to the extension of the extended vertical array at a location identified by the vertical location identifier; and
using only the vertical boundary pixels in the extended vertical array, without using the horizontal boundary pixels, to derive the prediction block of the target block.

4. The video decoding method according to claim 3, wherein the prediction mode information is information representing one of prediction directions.

5. A video encoder comprising a processor of a computer system and a memory that stores programs executable by the processor to implement an intra-prediction operation that derives a prediction block of a target block with boundary pixels of the target block interpolated along an intra prediction angle, wherein the boundary pixels comprise a horizontal array of horizontal boundary pixels located immediately above the target block and a vertical array of vertical boundary pixels located immediately left of the target block, the intra-prediction operation implemented by the processor to:
execute a step of executing, based on prediction mode information indicating prediction mode, either
a first process including:
obtaining a value of an inverse angle parameter, corresponding to the intra prediction angle, from a look-up table which lists values of inverse angle parameters in relation, respectively, to a plurality of different intra prediction angles;
identifying at least some of the vertical boundary pixels located in the vertical array at positions which are a function of multiplication between the obtained value of the inverse angle parameter and a value of a horizontal location identifier which is a variable representing positions in an extension of an extended horizontal array;
adding the identified at least some of the vertical boundary pixels as horizontal boundary pixels to the extension of the extended horizontal array at a location identified by the horizontal location identifier; and
using only the horizontal boundary pixels in the extended horizontal array, without using the vertical boundary pixels, to derive the prediction block of the target block, or a second process including:
obtaining a value of an inverse angle parameter, corresponding to the intra prediction angle, from a look-up table which lists values of inverse angle parameters in relation, respectively, to a plurality of different intra prediction angles;
identifying at least some of the horizontal boundary pixels located in the horizontal array at positions which are a function of multiplication between the obtained value of the inverse angle parameter and a value of a vertical location identifier which is a variable representing positions in an extension of an extended vertical array;
adding the identified at least some of the horizontal boundary pixels as vertical boundary pixels to the extension of the extended vertical array at a location identified by the vertical location identifier; and
using only the vertical boundary pixels in the extended vertical array, without using the horizontal boundary pixels, to derive the prediction block of the target block.

6. A video decoder comprising a processor of a computer system and a memory that stores programs executable by the processor to implement an intra-prediction operation that derives a prediction block of a target block with boundary pixels of the target block interpolated along an intra prediction angle, wherein the boundary pixels comprise a horizontal array of horizontal boundary pixels located immediately above the target block and a vertical array of vertical boundary pixels located immediately left of the target block, the intra-prediction operation implemented by the processor to:
execute:
a prediction mode decoding step of decoding prediction mode information indicating prediction mode from encoded video signals; and
an executing step of executing, based on the prediction mode information decoded in the prediction mode decoding step, either
a first process including:
obtaining a value of an inverse angle parameter, corresponding to the intra prediction angle, from a look-up table which lists values of inverse angle parameters in relation, respectively, to a plurality of different intra prediction angles;
identifying at least some of the vertical boundary pixels located in the vertical array at positions which are a function of multiplication between the obtained value of the inverse angle parameter and a value of a horizontal location identifier which is a variable representing positions in an extension of an extended horizontal array;
adding the identified at least some of the vertical boundary pixels as horizontal boundary pixels to the extension of the extended horizontal array at a location identified by the horizontal location identifier; and
using only the horizontal boundary pixels in the extended horizontal array, without using the vertical boundary pixels, to derive the prediction block of the target block, or a second process including:
obtaining a value of an inverse angle parameter, corresponding to the intra prediction angle, from a look-up table which lists values of inverse angle parameters in relation, respectively, to a plurality of different intra prediction angles;
identifying at least some of the horizontal boundary pixels located in the horizontal array at positions which are a function of multiplication between the obtained value of the inverse angle parameter and a value of a vertical location identifier which is a variable representing positions in an extension of an extended vertical array;

adding the identified at least some of the horizontal boundary pixels as vertical boundary pixels to the extension of the extended vertical array at a location identified by the vertical location identifier; and using only the vertical boundary pixels in the extended vertical array, without using the horizontal boundary pixels, to derive the prediction block of the target block.

\* \* \* \* \*

UNITED STATES PATENT AND TRADEMARK OFFICE
CERTIFICATE OF CORRECTION

PATENT NO. : 10,841,613 B2
APPLICATION NO. : 16/510188
DATED : November 17, 2020
INVENTOR(S) : Frank Jan Bossen et al.

Page 1 of 1

It is certified that error appears in the above-identified patent and that said Letters Patent is hereby corrected as shown below:

In the Claims

In Column 19, Claim 1, Line 32, delete "army" and replace with --array--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*